(12) United States Patent
Poon et al.

(10) Patent No.: US 9,360,393 B2
(45) Date of Patent: Jun. 7, 2016

(54) DETERMINING DAMAGE AND REMAINING USEFUL LIFE OF ROTATING MACHINERY INCLUDING DRIVE TRAINS, GEARBOXES, AND GENERATORS

(75) Inventors: Andy Poon, Nottingham (GB); Xiaoqin Ma, Nottingham (GB); John Karl Coultate, Nottingham (GB); Evgenia Golysheva, Loughborough (GB)

(73) Assignee: Romax Technology Limited, Nottingham (GB)

( * ) Notice: Subject to any disclaimer, the term of this patent is extended or adjusted under 35 U.S.C. 154(b) by 109 days.

(21) Appl. No.: 14/119,158

(22) PCT Filed: May 21, 2012

(86) PCT No.: PCT/GB2012/051154
§ 371 (c)(1),
(2), (4) Date: Nov. 20, 2013

(87) PCT Pub. No.: WO2012/160371
PCT Pub. Date: Nov. 29, 2012

(65) Prior Publication Data
US 2014/0088888 A1    Mar. 27, 2014

(30) Foreign Application Priority Data

May 20, 2011  (GB) .................................. 1108476.1
Jun. 14, 2011  (GB) .................................. 1110003.9
Jun. 20, 2011  (GB) .................................. 1110360.3

(51) Int. Cl.
*G01M 13/00*   (2006.01)
*F03B 15/00*   (2006.01)
(Continued)

(52) U.S. Cl.
CPC ............... *G01M 13/00* (2013.01); *F03B 15/00* (2013.01); *F03D 1/003* (2013.01); *F03D 7/02* (2013.01);
(Continued)

(58) Field of Classification Search
CPC ... G05B 23/0283; G05B 23/00; G01M 13/00; F03B 15/00; F03D 1/003; F03D 7/02; F03D 11/0091; F05B 2260/821; F05B 2260/84; F05B 2270/332; Y02E 10/226; Y02E 10/722; Y02E 10/723
USPC .......................................................... 702/34
See application file for complete search history.

(56) References Cited

U.S. PATENT DOCUMENTS 6,636,813 B1 * 10/2003 Isobe et al. ...................... 702/34
6,671,647 B2 * 12/2003 Ishii et al. ...................... 702/136
(Continued)

FOREIGN PATENT DOCUMENTS

EP    2302207 A1    3/2011
WO    2009/091335 A1    7/2009
WO    2011/060424 A1    5/2011

OTHER PUBLICATIONS

Anonymous, Condition Monitoring—An Owner's Perspective, URL:http://www.renewable-uk.com/events/offshore-wind-conference/Proceedings/pdf/Nussey.pdf, Jul. 5, 2010.

*Primary Examiner* — Michael Zarroli

(57) ABSTRACT

A method for predicting remaining useful life of a wind or water turbine or component determines in step (116) an accumulated damage for the turbine or component and compares this in step (118) to preset damage limit obtained in step (114). This provides a simple approach to estimating remaining useful life, giving the turbine operator an indication of the condition of turbines or farms under management.

9 Claims, 8 Drawing Sheets

(51) Int. Cl.
    *F03D 11/00* (2006.01)
    *G05B 23/02* (2006.01)
    *F03D 7/02* (2006.01)
    *F03D 1/00* (2006.01)
    *G05B 23/00* (2006.01)

(52) U.S. Cl.
    CPC ............ *F03D 11/0091* (2013.01); *G05B 23/00* (2013.01); *G05B 23/0283* (2013.01); *F05B 2260/821* (2013.01); *F05B 2260/84* (2013.01); *F05B 2270/332* (2013.01); *Y02E 10/226* (2013.01); *Y02E 10/722* (2013.01); *Y02E 10/723* (2013.01)

(56) References Cited

U.S. PATENT DOCUMENTS

| | | | |
|---|---|---|---|
| 7,065,471 B2 * | 6/2006 | Gotoh et al. | 702/183 |
| 7,103,507 B2 * | 9/2006 | Gorinevsky et al. | 702/184 |
| 8,510,060 B2 * | 8/2013 | Hardwicke et al. | 702/34 |
| 8,761,912 B1 * | 6/2014 | Chapman et al. | 700/83 |
| 2003/0100974 A1 | 5/2003 | Alvarez et al. | |
| 2008/0140349 A1 | 6/2008 | Behera et al. | |
| 2008/0228314 A1 | 9/2008 | Sjostrand et al. | |
| 2010/0206058 A1 | 8/2010 | Kunze et al. | |
| 2010/0298995 A1 | 11/2010 | Zhang et al. | |
| 2011/0106510 A1 * | 5/2011 | Poon | 703/2 |
| 2014/0088887 A1 * | 3/2014 | Poon et al. | 702/34 |

* cited by examiner

DETERMINING DAMAGE AND REMAINING USEFUL LIFE OF ROTATING MACHINERY INCLUDING DRIVE TRAINS, GEARBOXES, AND GENERATORS

CROSS-REFERENCE TO RELATED APPLICATIONS

This application is the U.S. national stage application of International Application No. PCT/GB2012/051154, filed May 21, 2012, which international application was published on Nov. 29, 2012, as International Publication WO2012/160371 in the English language. The International Application claims the benefit of UK Patent Application Nos. GB1108476.1, filed May 20, 2011; GB1110003.9, filed Jun. 14, 2011; and GB1110360.3, filed Jun. 20, 2011. The above-mentioned patent applications are herein incorporated in their entirety by reference.

BACKGROUND OF THE INVENTION

1. Field of the Invention

The present invention relates to methods for determining damage and remaining useful life of rotating machinery including drive trains, gearboxes, and generators of wind and water turbines and components thereof, and using these data to operate and manage turbine installations. The methods relate to determination of accumulated damage for the machinery and comparing it with a preset damage limit value. Here damage is the measure of a deteriorating condition of mechanical or electrical components of the drive train, gearbox or generator. Once a component has reached 100% damage, this component has failed and is no longer suitable for use. For example extensive spalling on the bearing raceway, gear tooth crack or shorted winding will require the replacement of the damaged component. Once accumulated damage is calculated it can be compared to a preset damage limit value and the remaining useful life can be estimated.

2. Description of Related Art

Although the design life of a wind turbine gearbox is typically more than twenty years, failures of wind turbine gearboxes within four to five years are not uncommon. This is because damage progression calculation procedures are based on assumed operating profiles, whereas in operation, the actual profile could be very different.

Monitoring operating parameters related to the operation of a wind or water turbine or component thereof, and determining when these parameters move outside an operating window, may indicate that some kind of maintenance or investigation is needed. Operating parameters that are monitored could include lubrication temperature, lubrication debris, vibration, and power output.

Vibration is commonly-measured by Condition Monitoring Systems. Generally speaking, large vibrations compared to a norm is indicative of damage.

Vibration analysis generally relies on a measurement provided by a sensor exceeding a predetermined threshold, which is prone to false alarms if the threshold is set too low. The threshold level is not necessarily constant and may vary with frequency (and hence speed). The presence of shocks and extraneous vibrations means that the threshold level must be set sufficiently high to minimise the risk of false-alarms. Furthermore, the threshold must be sufficiently high to avoid any negative effects caused by 'creep' in sensor performance which may occur over its lifetime. In addition, there is no discrimination between vibrations associated with failure or damage and those which are not indicative of failure or damage.

Faults developing during operation, such as an imbalance in the rotor, can create loads on a bearing in excess of that expected resulting in a reduction in its design life. Incipient faults, such as unbalance, can be detected from analysis of vibration signatures. This gives the magnitude of an imbalance, and an excitation force due to imbalance is a function of the magnitude of the imbalance and square of the speed. An excitation force due to faults can thus be calculated from field operational conditions and used to calculate individual component loads. Deviation from the assumed operating profile can be addressed by using a generic wind simulation model to determine load at the turbine shaft, which allows individual component load based on the field operational conditions to be calculated. Combining these gives the total load at each component, which can be is used to estimate the damage of the individual components and the damage of the gearbox.

However, shortcomings in wind simulation models mean that the load at the turbine shaft may not be reliably or accurately determined.

BRIEF SUMMARY OF THE INVENTION

According to a first aspect, the present invention provides a method for determining damage to one or more rotating machines including drive trains, generators, or gear boxes of wind turbines or water turbines, or components thereof, comprising the steps of: providing data relating to one or more operating conditions; providing one or more damage coefficients relating to the one or more operating conditions; and calculating the damage as a function of the one or more operating conditions and the one or more damage coefficients.

Preferably, the rotating machines include drive trains, generators, gear boxes, wind turbines or water turbines.

Preferably, the damage is accumulated damage, the method comprising the additional step of: calculating a sum the damage for each operating condition over a duration of all operating conditions.

Preferably, the step of providing one or more damage coefficients comprises the steps of: determining damage under rated operating conditions and under the one or more operating conditions of the same duration; and calculating the one or more damage coefficients as a function of the damage under rated conditions and the damage under the one or more operating conditions.

Preferably, the step of providing data comprises providing data relating to one or more steady state operating conditions. Preferably, the step of providing data comprises providing data relating to one or more transient state operating conditions. Preferably, the step of providing data comprises providing historical data. Preferably, the step of providing data comprises collecting data from one or more sensors monitoring the one or more operating conditions. Preferably, the step of providing data comprises providing data from a condition monitoring system.

Preferably, the step of providing one or more damage coefficients comprises providing damage coefficients relating to one or more steady state operating conditions. Preferably, the step of providing one or more damage coefficients comprises providing damage coefficients relating to one or more transient state operating conditions.

Also disclosed is a method for predicting remaining useful life of a rotating machine or a component thereof, the method comprising the steps of: obtaining a damage limit value for the rotating machine or component thereof and a corresponding life; determining damage for the rotating machine or component thereof according to the methods disclosed above; and determining the remaining useful life from the damage limit, the corresponding life, and the damage.

Preferably, the step of investigating for actual damage is selected from the group consisting of: using an endoscope, performing vibration analysis and performing lubrication analysis.

Also disclosed is a method for identifying a wind turbine or component thereof for maintenance, the method comprising the steps of: determining damage for the rotating machine or component thereof according to the methods described above; analysing operating data for the wind turbine or component thereof; and comparing the operating data with a threshold related to the damage value.

Preferably, the operating data is vibration data.

Preferably, identifying a wind turbine or component thereof for maintenance comprises identifying a wind turbine or component thereof in which the operating data is greater than the threshold.

Also disclosed is a method for calculating a damage weighting factor for a wind or water turbine or a component thereof, the method comprising the steps of: assessing damage to the wind or water turbine or a component thereof under rated operating conditions and under a plurality of field operating conditions; calculating the weighting factor from the expected life under rated conditions and the expected life caused under the plurality of field operating conditions; wherein the step of assessing damage comprises the step of providing information on the wind or water turbine or a component thereof.

Preferably, the step of providing information includes providing one or more models selected from the group consisting of: a nominal model of the gearbox, drive-train and/or generator; a model unique to the specific gearbox, drive-train and/or generator including information on one or more manufacturing variations of one or more components of the gearbox, drive-train and/or generator; a fully coupled finite element model comprising nodes with six degrees of freedom unique to the gearbox, drive-train and/or generator; and one or more meta-models, wherein the one or more meta-models are specific for each of the one or more components.

Preferably, the damage coefficient or weighting factor is a function of the expected life under rated operating conditions and expected life under field operating conditions. Preferably, the damage coefficient or weighting factor is a function of a ratio of expected life under rated operating conditions to expected life under field operating conditions. Preferably, the damage coefficient or weighting factor is a ratio of expected life under rated operating conditions to damage under field operating conditions.

Also disclosed is a computer readable product comprising code means designed for implementing the steps of the method according to any of the foregoing.

Also disclosed is a computer system comprising means designed for implementing the steps of the method according to any of the foregoing.

BRIEF DESCRIPTION OF THE SEVERAL VIEWS OF THE DRAWINGS(S)

The present invention will now be described, by way of example only, with reference to the accompanying drawing, in which.

DETAILED DESCRIPTION OF THE INVENTION

Figure 1:
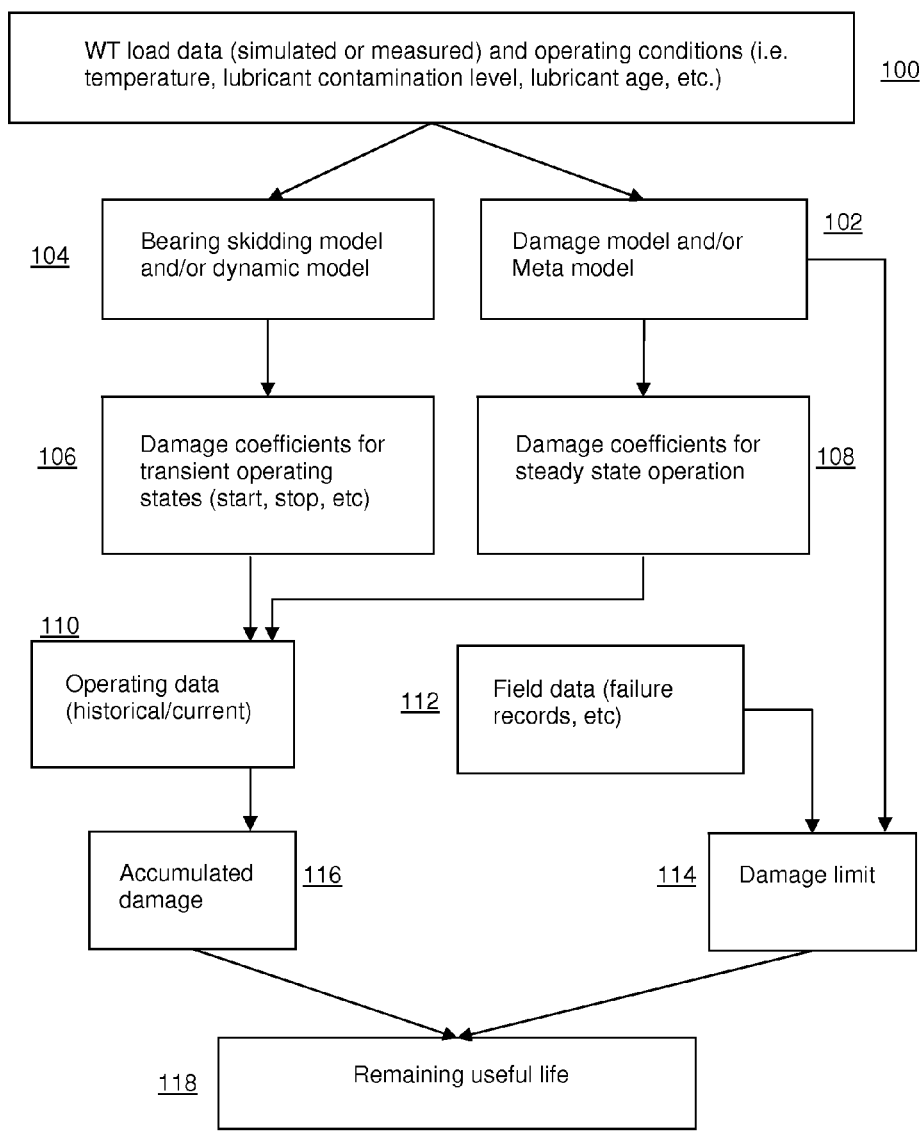
FIG. 1 shows a flow chart for predicting accumulated damage and remaining useful life of a wind or water turbine or components thereof.

Approaches to calculating damage to a rotating machine, such as a gearbox, drive train, generator, wind turbine or a water turbine, or individual components of these rotating machines, is illustrated in FIG. 1, which also shows setting a damage limit and a method for determining residual useful life.

In a first step 100 turbine load data (which may be simulated or measured) is collected and operating conditions, such as temperature of various bearings, oil conditions, and the like are sensed and logged. Operating condition data can be chosen to represent a typical range of conditions, or it can be obtained from historical logged data such as SCADA or a condition monitoring system.

This data can be used in step 102 in a damage-determining model or meta model to determine damage coefficients 108 relating to steady-state operating conditions.

Corresponding damage coefficients 106 for non-steady state (transient) conditions can be determined in step 104 using a dynamic model of wind turbine and components, and/or a bearing skidding model, model of the lubrication system or the like.

In step 110, current or historical data is provided and damage is derived from this data and the damage coefficients determined in steps 106 and 108, where damage is a function of an operating condition and a corresponding damage coefficient.

Accumulated damage (AD), in simple terms, defines damage accumulated by a wind or water turbine or components during various experienced operating conditions. The AD is equal to a damage coefficient related to the operational condition multiplied by a calculated damage from rated conditions of the same duration. For any operation in which damage caused is the same as that expected to be caused under rated conditions, the AD of a component after a certain time duration will be the same as calculated damage at rated conditions for the same duration and the coefficient relating these damages will be 1.0. If an operational event causes greater damage than rated conditions, then the accumulated damage during this operational event will be increased accordingly.

$$AD = f(\text{operating condition, damage coefficient})$$

In steps 112 and 114, a damage limit, which is the level of damage at which the rotating machine or a component thereof is no longer suitable for use. (100% or any other preset value depending on application), is determined from the damage model and the field data (failure records and the like). The damage limit typically has an associated life: thus the damage limit is the level of damage expected when the rotating machine or component thereof reaches the end of its life.

In step 116, an accumulated damage under real operating conditions is calculated.

Finally, remaining useful life is calculated in step 118 using accumulated damage, the damage limit and duration of operation causing preset damage.

In the present invention, damage coefficients are obtained from assessing damage to the wind or water turbine or a component thereof under field operating conditions and damage to the wind or water turbine or a component thereof under rated operating conditions of the same duration.

The wind or water turbine or a component thereof includes any component of the wind or water turbine and includes, for example, the turbine, turbine shaft, gearbox drive train, and generator, as well as any subcomponent, such as a gear, a drive shaft, and the like.

The damage coefficient is a function of the damage under rated operating conditions and damage under field operating conditions of the same duration. It can be a function of a ratio of damage under rated operating conditions to damage under field operating conditions of the same duration.

Figure 2:
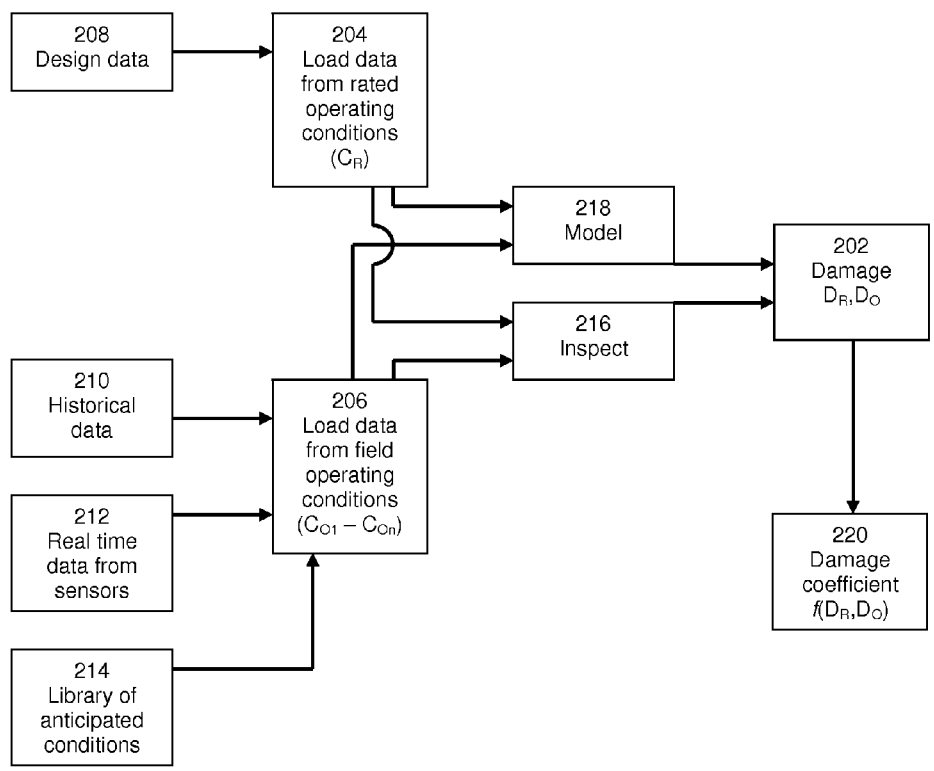
FIG. 2 shows a flow chart for the determination of damage coefficients for a wind or water turbine or component thereof.

FIG. 2 shows a flow chart for the determination of damage coefficients for a wind or water turbine or component thereof.

Load data 204,206, for example forces and/or moments, acting on the wind or water turbine or component thereof is provided.

Load data 204 relates to operation under rated operating conditions (CR), which are the conditions for which the wind or water turbine or a component thereof was designed. Load data 204 can be obtained or derived from design data 208.

Load data 206 relates to loading under field operating conditions ($C_O$).

Field operating conditions can be historical sensor data 210 or SCADA data obtained from or derived from a CMS.

Field operating conditions can be real time sensor data 212 from actual operating conditions under which the wind or water turbine or a component thereof is being operated. This means that damage coefficients can be calculated in real time. These coefficients can be stored and used again when similar field operating conditions are experienced, leading to a reduction in computing capability required over time.

Field operating conditions can be a library of anticipated conditions 214 which is a range of operating conditions under which the wind or water turbine or a component thereof may be expected to operate. Alternatively or additionally, a library of anticipated conditions 214 can be populated by historical sensor data 210 or real time sensor data 212. This means that damage coefficients can be calculated in advance of operation, reducing the amount of computing capability required during operation.

Design data 208, historical data 210, real time data 212 and library data 214 can comprise continuous ranges of data, or the data can be stratified into bins to simplify calculations.

The operating conditions can be steady state operating conditions or transient operating conditions.

Damage 202 under rated and field operating conditions is determined from information relating to the wind or water turbine or a component thereof. The information can be provided by inspection 216, or by using a model 218 of the wind or water turbine or component thereof.

The damage coefficient 220 is a function of the damage under rated operating conditions and damage under field operating conditions of the same duration. It can be a function of a ratio of damage under rated operating conditions to damage under field operating conditions of the same duration. It can be a ratio of damage under rated operating conditions to damage under field operating conditions of the same duration.

Where design data 208, historical data 210, real time data 212 or library data 214 does not contain measured or specified load information, data 204, 206 can be derived from other specified or measured parameters present in the data. The derivation can be a simple manipulation of the data available, or it can be obtained using model 218 of the wind or water turbine or component thereof (not shown).

Various models may be used. For example, a unique model may be generated for one or more of each of the components of the wind or water turbine that leaves a production line. Each unique model is generated using the dimensions and clearances inferred from an end of line test and may remain related to the corresponding component throughout its operational life. The unique model can be used to calculate the loads, for example forces and/or moments, that may act on a component at any location or particular locations in or on the component according to the operating conditions. This in turn permits the calculation of the damage sustained by each component under rated or field operating conditions.

Figure 3:
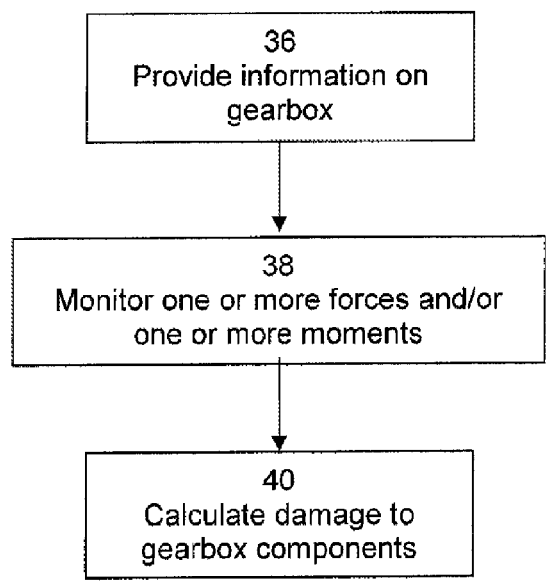
FIG. 3 shows the steps in a method for calculating damage to a wind or water turbine or a component thereof using a model-based approach.

FIG. 3 shows the steps in a method for calculating damage to a wind or water turbine or a component thereof using a model-based approach. The component may be, for example a gearbox, as indicated.

In a first step 36, information on a gearbox is provided. This may include a fully coupled model with six degrees of freedom. The model may also be unique to the gearbox. The information may include information relating to one or more manufacturing variations in the dimensions and clearances of components of a gearbox.

In a second step 38, loads, for example forces and/or moments, acting on the gearbox during field operating conditions can be monitored during operation or provided from historical data (eg SCADA). Alternatively the loads can be calculated from anticipated field operating conditions. Similarly the loads can be calculated from rated operating conditions. Where loads acting on the gearbox are continuously monitored during operation, these measurements may be taken at a regular sampling frequency of e.g. 50 Hz. In various embodiments of the invention, step 38 may include monitoring one or more loads over time. Monitoring one or more loads may include monitoring outputs of one or more condition monitoring sensors placed in or on the gearbox at predetermined locations.

In third step 40, the damage caused to each component by the one or more loads, in each sample of data, however determined is calculated. To do this, the fully coupled system model described above is used to calculate the system deflections and component loads. The contact between gear teeth is modelled using finite elements taking into account the tooth bending stiffness and gear mesh contact stiffness. These stiffnesses can be calculated or based on empirical data and are taken into account in the static deflection analysis of the full model. The tooth face load distribution, tooth contact stress or bending stress may be calculated for each gear mesh. These values may then be compared with empirical data or empirical methods used to calculate the operating contact stress, e.g. according to methods given in ISO 6336-2. The tooth bending stress may be calculated using finite element models or may be calculated using empirical methods, e.g. methods in ISO 6336-3. S-N curves for gear contact failure and gear bending failure may be employed and may be based on mathematical simulations or may be based on empirical data, e.g. data provided in ISO 6336. A prediction of the cumulative damage on each component is continuously updated, thus allowing the remaining life of each component to be predicted using empirical data e.g. S-N curves and bearing life data available from ISO standards.

The calculation of bearing damage can be performed using the RomaxDesigner software. This calculation takes into account factors such as bearing internal geometry, stiffness and deformation of bearing components, contact between bearing components and considers the bearing loads and stiffness.

It is possible that the provided gearbox information cannot be analysed at as high a frequency as the data is sampled. For example, the model analysis required to predict the damage due to each sample of data may take 1 second, but the data may be sampled at 50 Hz. In this case an approximation (a meta-model) can be employed so that the damages are predicted more quickly.

The meta-model is constructed in three stages:
1) a number of data samples are obtained from a gearbox model prior to the start of gearbox operation;
2) an underlying trend is determined using response surface methodology (RSM);
3) Gaussian deviations from this trend are introduced using a Gaussian kernel centred on each sample point.

The meta-model may be constructed using only steps 1) and 2) above.

Figure 4:
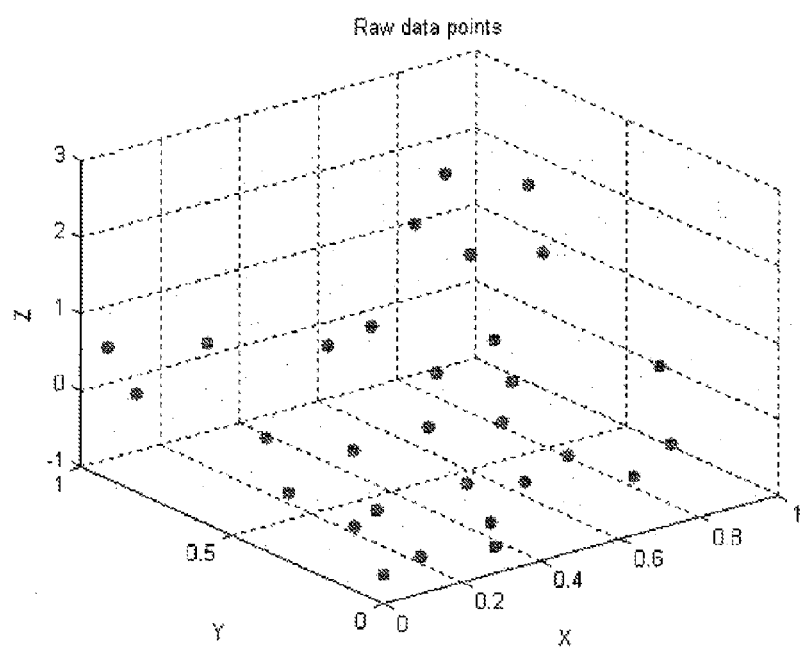
FIGS. 4, 5 and 6 show stages in the construction of a meta model.
Figure 5:
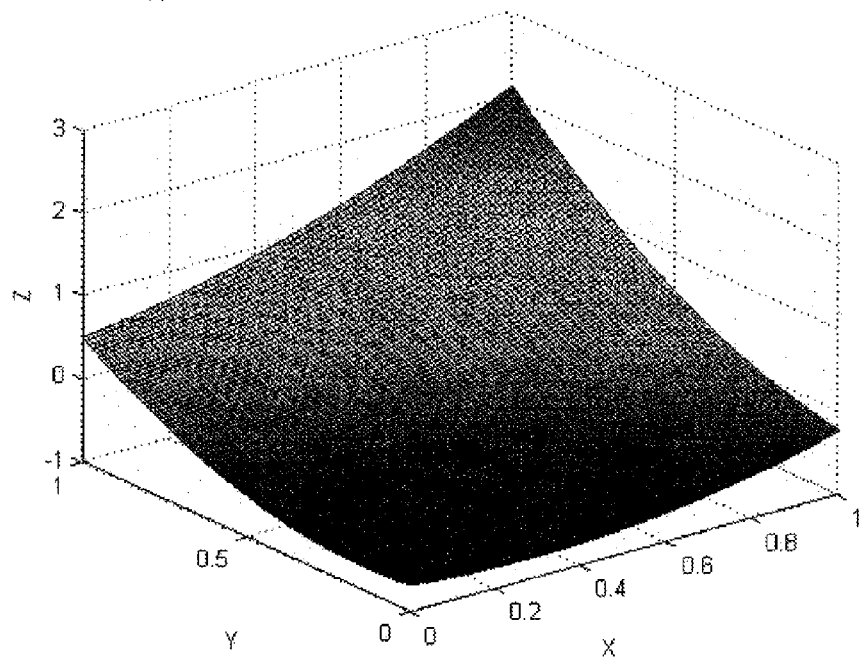
Figure 6:
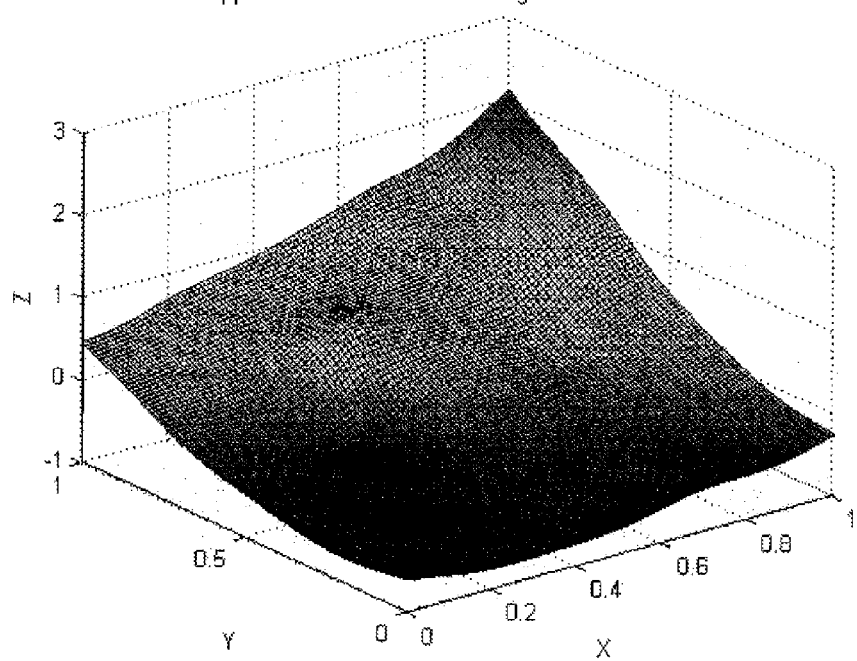

FIGS. 4 to 6 show the three stages listed above applied to a two-variable problem. FIG. 4 shows the plotted raw data points. FIG. 5 shows the approximation function constructed from a second order polynomial. FIG. 5 shows the approximation function including Gaussian kernels.

The variables in the meta-model can be one or more of the following loads which may be defined anywhere in the gearbox model, drivetrain or generator: force in the x-direction ($F_x$); force in the y-direction ($F_y$); force in the z-direction ($F_z$); moment about the x-axis ($M_x$); moment about the y-axis ($M_y$), moment about the z-axis ($M_z$). Alternatively, the variables may include displacements in any of the x, y and z directions or rotations about any of the x, y, and z axes or temperature.

The meta-model is constructed from data samples each of which corresponds to a different combination of any of the variables listed above. The accuracy of the meta model can depend on the method used to determine the variables used to generate each data sample. A sampling regime in which the sample points are randomly determined is possible but is not ideal because it can result in some data samples having similar variables which may result in the meta-model being inaccurate. Spacing the data samples uniformly in the design space represented by the meta-model variables is preferred.

Uniform sampling of data in the meta-model variables design space is achieved by optimising the sampling strategy using a genetic algorithm. One method is to maximise the minimum distance between any two neighbouring sample points. Many other suitable sampling strategies exist in the literature including minimising the maximum distance between any two neighbouring sample points; L2 optimality; latin hypercube sampling.

The process of identifying the underlying trend using Response Surface Methodology (RSM) consists of fitting a polynomial to the sample data using linear regression. The polynomial can be of any order and may include some or all of the possible terms. The number of variables in the polynomial is equal to the number of variables in the meta-model. A transformation can be applied to the sampled data before fitting the polynomial in order to decrease the 'model bias' which can arise due to the assumption that the data follows a polynomial trend. For example, if the behaviour of the response is observed to follow a trend similar to an exponential, then a polynomial can be fitted to the natural log of the variables in order to improve the meta-model accuracy.

The Gaussian deviations (step 3 above) may be represented by Gaussian functions with a number of dimensions equal to the number of variables in the meta-model. The deviations are not required to be Gaussian functions and may be represented by another mathematical function. The amplitude of each deviation may be equal to or related to the difference between the output of the polynomial model and the response level of the data sample.

A unique meta-model is constructed for each component in the gearbox (i.e. for each gear and bearing) to relate the measured variables with the resulting tooth face load distribution factor, $KH_\beta$, (for gears, as defined in ISO 6336) and load zone factor (for bearings, as defined in ISO 281). Any number of loads, for example forces and/or moments, acting at any point on the gearbox, drive train or generator may be related to these factors by the meta-models. The load zone factors and $KH_\beta$ values may then be used to calculate a corresponding amount of damage caused to each component. The meta-models may alternatively relate the measured variables with component stresses, component lives or percentage damages.

Figure 7:
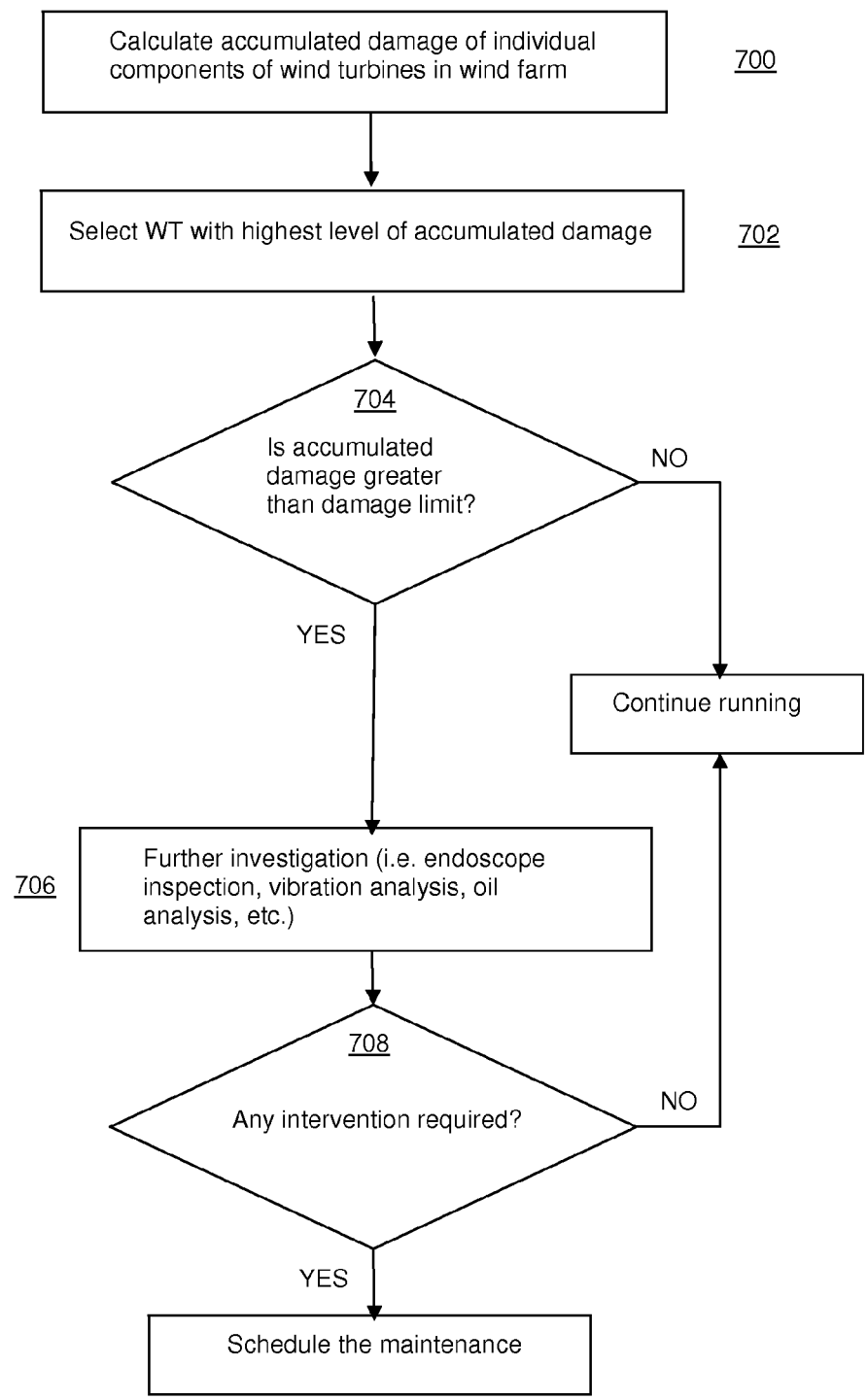
FIG. 7 shows a flow chart for scheduling maintenance of a wind or water turbine or components thereof based on an accumulated damage.

FIG. 7 shows a method for scheduling maintenance of wind or water turbine or components thereof based on an accumulated damage.

In step 700, the current accumulated damage of the turbines in the turbine farm is determined, for example as disclosed above in relation to FIG. 1.

In step 702, a turbine or turbines having the highest accumulated damage on one or more components is identified.

In step 704, the accumulated damage value or values from step 702 are compared with a damage limit preset for further forensic investigation. If the accumulated damage is less than this value, then no action is taken and the turbine continues operation.

If the accumulated damage is higher than this value, then in step 706 further investigations of the turbine are undertaken, for example endoscope inspection, vibration analysis, oil analysis and the like.

In step 708, the results of the investigation are assessed: if the investigation indicates that the turbine does not have an operational problem, then no action is taken and the turbine continues operation.

If the investigation indicates that the turbine does have an operational problem, then maintenance is scheduled and the turbine may be concomitantly down-rated.

Figure 8:
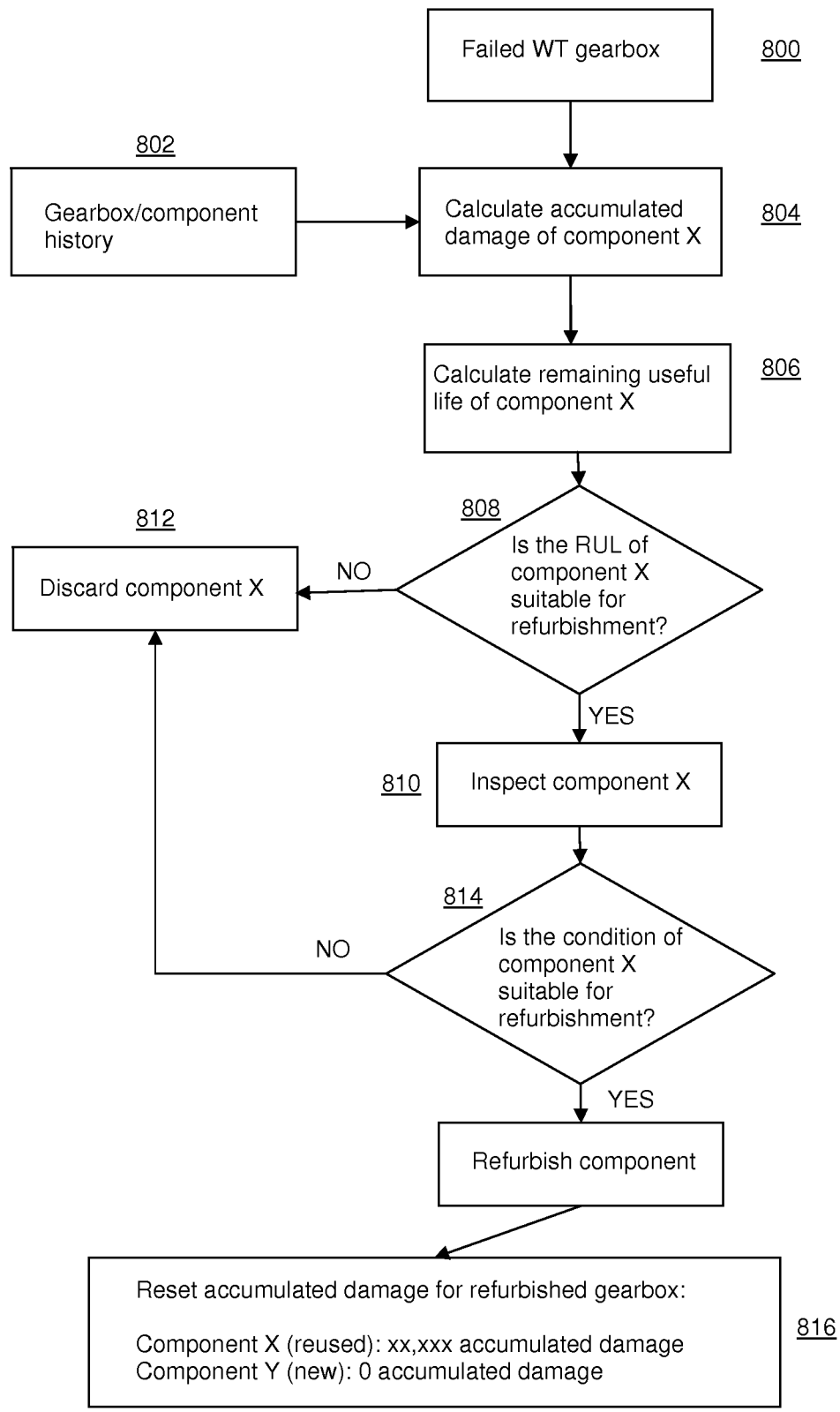
FIG. 8 shows a flow chart for gearbox refurbishment based on accumulated damage.

FIG. 8 shows a method for gearbox refurbishment based on accumulated damage.

In step 800, a failed turbine gearbox is provided, and in step 802 a corresponding gearbox and/or gearbox component history is provided.

In steps 804 and 806, an accumulated damage of a component is determined as disclosed above in relation to FIG. 1.

In step 808, an evaluation is made as to whether or not the accumulated damage for the component indicates that refurbishment of the component may be worthwhile. If it is not, then the component is discarded.

If it is, then in step 810, the component is inspected.

In step 814, if the inspection indicates that refurbishment of the component is not worthwhile, the component is discarded.

In step 814, if the inspection indicates that component is suitable for refurbishment, the component is retained to provide a refurbished gearbox.

In step 816, if the component has been replaced, the accumulated damage for the new component is set to zero.

According to a further aspect of the invention a method for operating a wind or water turbine or component thereof is based on a quantitative measure of vibration in relation to accumulated damage for a wind or water turbine or component thereof.

The method may be illustrated by a simple example, in which operating parameter levels are stratified into three levels: low, medium and high.

As mentioned above, the danger or damage from increased vibration is dependent to a certain extent to the age of the wind or water turbine or component thereof, in other words, to accumulated damage. Accumulated damage can be similarly stratified into three zones, low, medium and high.

This simple approach enables the wind or water turbine operator to prioritise maintenance activities based on accumulated damage and CMS data, as for example in Table 1.

TABLE 1

Action needed according to a value for AD and a level of an operating parameter

| Operating parameter | Accumulated damage | | |
|---|---|---|---|
| | Low | Medium | High |
| High | | | Turbine inspection recommended |
| Medium | | Investigation needed | |
| Low | | | |

The same approach may be adopted for other CMS data which may be used to monitor wind turbines by identifying wind turbines which exceed a threshold value.

Figure 9:
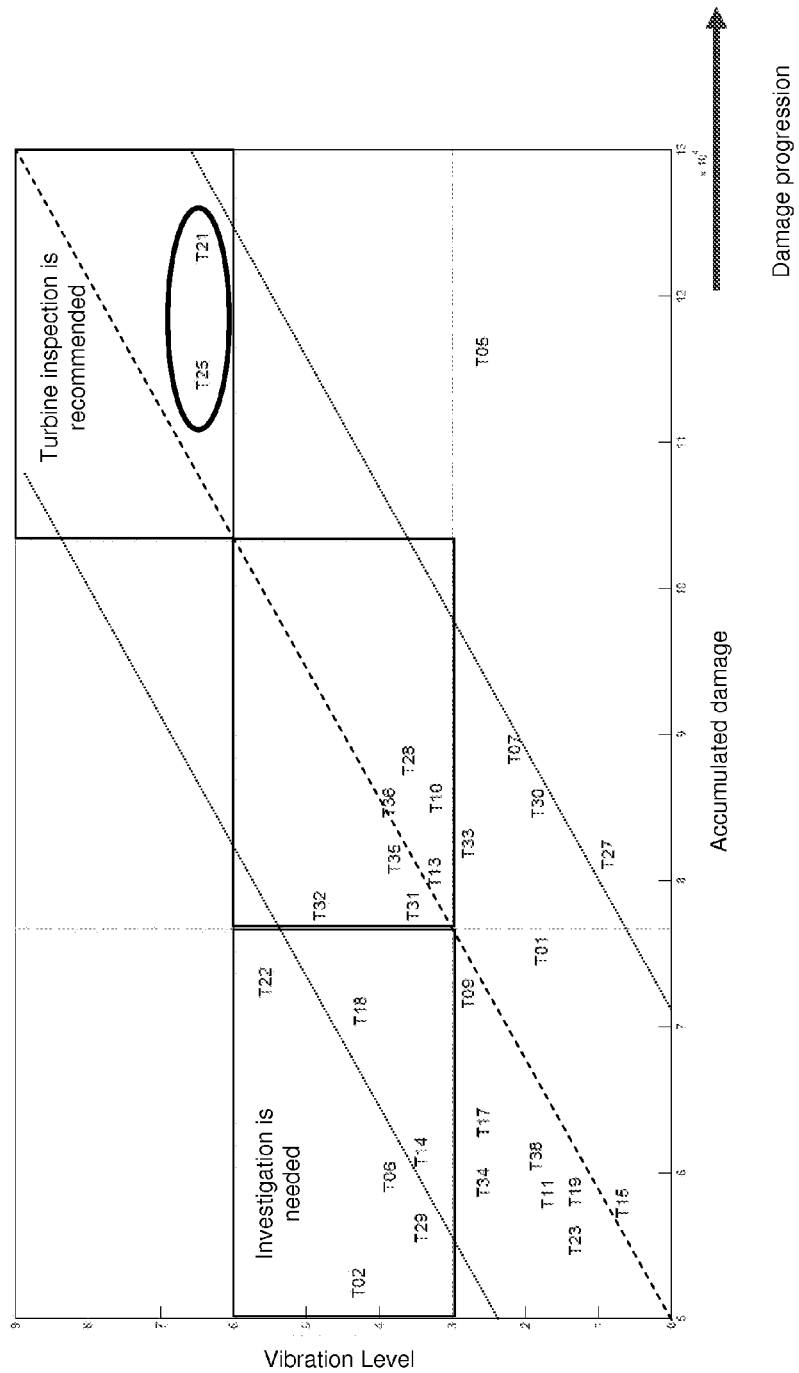
FIG. 9 shows a graph combining accumulated damage models with vibration data for a number of turbines operating in a wind farm.

FIG. 9 shows a graph combining damage models with vibration data for a number of turbines (T01 to T38) operating in a wind farm. Vibration levels in this context can be based on vibration signature analysis Turbines with moderate accumulated damage and vibration typically require routine monitoring and planned inspections over a longer period.

Moderate levels of vibration when accumulated damage values are low, for example turbine T02 in FIG. 9, may indicate that the wind or water turbine or component thereof should be investigated to see if one or more components are suffering damage and need to be repaired or replaced.

However, moderate levels of vibration at median values of accumulated damage are probably normal, and should be merely monitored routinely. Moderate levels of vibration at high values of accumulated damage require no action.

High levels of vibration at high accumulated damage values may be indicative of a need for turbine inspection. Turbines with high accumulated damage and high vibration (circled) can clearly be identified, and these require inspection.

Turbine T34 in FIG. 9 has a similar vibration level to turbine T05, but turbine T34 has a low accumulated damage. The former turbine is clearly operating better than other turbines of a similar damage. Using a system for identifying turbines in need of maintenance based on thresholds alone would consider these two turbines to have the same status.

In addition to the approaches above, an additionally indicator of a requirement for maintenance may be obtained by collecting data relating to vibration of the wind or water turbine or component thereof on a test rig prior to installation. This can be taken as a subsequent baseline: increases in vibration after installation may be due to damage during transport or poor assembly.

Figure 10:
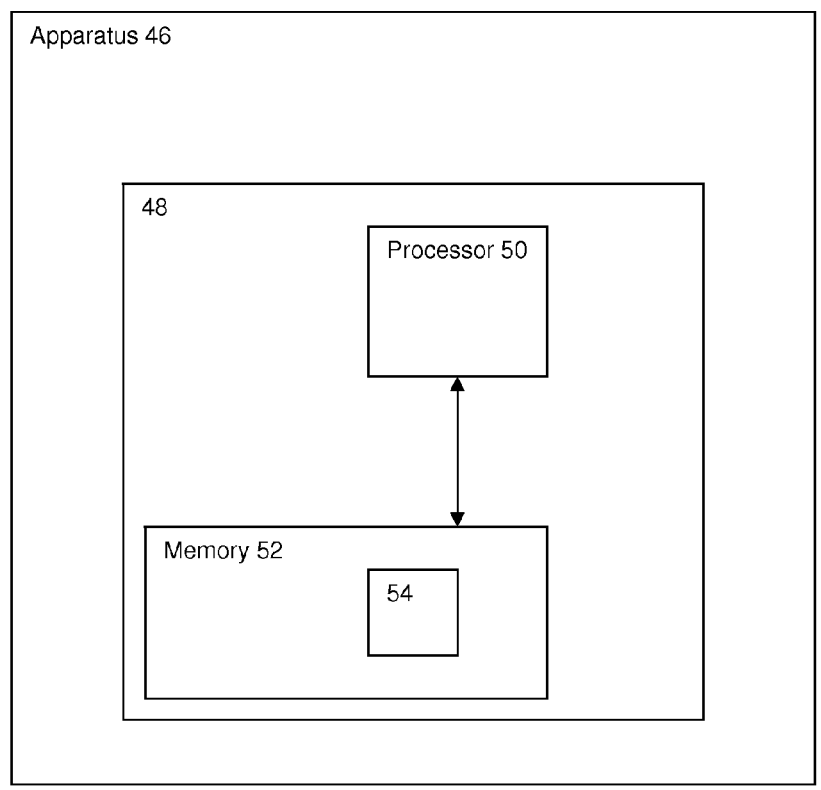
FIG. 10 illustrates a schematic diagram of an apparatus according to various embodiments of the invention.
Figure 10:
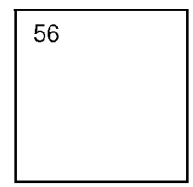

FIG. 10 illustrates a schematic diagram of an apparatus 46 according to various embodiments of the present invention. The apparatus 46 includes means 48 for performing the steps illustrated in FIGS. 1 to 9. Means 48 includes a processor 50 and a memory 52. The processor 50 (e.g. a microprocessor) is configured to read from and write to the memory 52. The processor 50 may also comprise an output interface via which data and/or commands are output by the processor 50 and an input interface via which data and/or commands are input to the processor 50.

The memory 52 stores a computer program 54 comprising computer program instructions that control the operation of the apparatus 46 when loaded into the processor 50. The computer program instructions 54 provide the logic and routines that enables the apparatus 46 to perform at least some of steps of the methods illustrated in FIGS. 1 to 9. The processor 50 by reading the memory 52 is able to load and execute the computer program 54. Although the memory 52 is illustrated as a single component it may be implemented as one or more separate components some or all of which may be integrated/removable and/or may provide permanent/semi-permanent/dynamic/cached storage.

The computer program may arrive at the apparatus 46 via any suitable delivery mechanism 56. The delivery mechanism 56 may be, for example, a computer-readable storage medium, a computer program product, a memory device, a record medium such as a Blue-ray Disk®, CD-ROM or DVD, an article of manufacture that tangibly embodies the computer program 54. The delivery mechanism may be a signal configured to reliably transfer the computer program 54. The apparatus 46 may propagate or transmit the computer program 54 as a computer data signal.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The steps illustrated in the FIGS. 1 to 9 may represent steps in a method and/or sections of code in the computer program 54. The illustration of a particular order to the steps does not necessarily imply that there is a required or preferred order for the steps and the order and arrangement of the steps may be varied. Furthermore, it may be possible for some steps to be omitted.

The invention claimed is:

1. A method for assessing for refurbishing a failed wind or water turbine component comprising the steps of:
    predicting the remaining useful life of the component according to the steps of:
        obtaining a damage limit value for the rotating machine or component thereof;
        determining accumulated damage for the rotating machine or component thereof according to the steps of:

providing data relating to one or more operating conditions;

providing one or more damage coefficients relating to the one or more operating conditions; and calculating the damage as a function of the one or more operating conditions and the one or more damage coefficients; and determining the remaining useful life from the damage limit and the accumulated damage;

setting a refurbishment limit;

investigating for actual damage to the component when the residual useful life is greater than the refurbishment limit;

the component being repairable, refurbishing the component.

2. The method according to claim 1, in which the step of investigating for actual damage is selected from the group consisting of using an endoscope, performing vibration analysis and performing lubrication analysis.

3. A computer readable product comprising code means designed for implementing the steps of the method according to claim 1.

4. A computer system comprising means designed for implementing the steps of the method according to claim 1.

5. The method according to claim 1, in which the step of providing one or more damage coefficients comprises the steps of:

determining damage under rated operating conditions and under the one or more field operating conditions of the same duration; and calculating the one or more damage coefficients as a function of the damage under rated conditions and the damage under the one or more field operating conditions.

6. The method according to claim 5 in which the step of determining damage includes providing one or more models selected from the group consisting of:

a bearing skidding model;

a dynamic model;

a life model;

a nominal model of the gearbox, drive-train and/or generator;

a model unique to the specific gearbox, drive-train and/or generator including information on one or more manufacturing variations of one or more components of the gearbox, drive-train and/or generator;

a fully coupled finite element model comprising nodes with six degrees of freedom unique to the gearbox, drive-train and/or generator; and one or more meta-models, wherein the one or more meta-models are specific for each of the one or more components.

7. The method according to claim 6 in which the one or more damage coefficients are a function of a ratio of damage under rated operating conditions and damage under the one or more field operating conditions of the same duration.

8. The method according to claim 1, in which the step of providing data comprises one or more of the following:

providing data relating to one or more steady state operating conditions;

providing data relating to one or more transient state operating conditions;

providing historical data;

collecting data from one or more sensors monitoring the one or more operating conditions; and providing data from a condition monitoring system.

9. The method according to claim 1, in which the step of providing one or more damage coefficients comprises one or more of the following:

providing damage coefficients relating to one or more steady state operating conditions; and providing damage coefficients relating to one or more transient state operating conditions.

* * * * *